United States Patent [19]

Tomidokoro

[11] Patent Number: 4,618,062
[45] Date of Patent: Oct. 21, 1986

[54] FILM HOLDER FOR CAMERAS

[75] Inventor: Kanji Tomidokoro, Tokyo, Japan

[73] Assignee: Komamura Photographic Co., Ltd., Tokyo, Japan

[21] Appl. No.: 784,470

[22] Filed: Oct. 4, 1985

[30] Foreign Application Priority Data

Oct. 4, 1984 [JP] Japan .......................... 59-150289[U]

[51] Int. Cl.[4] .............................................. B65D 85/67
[52] U.S. Cl. ..................................... 206/455; 206/456
[58] Field of Search ............... 206/455, 456, 449, 453

[56] References Cited

U.S. PATENT DOCUMENTS

| | | | |
|---|---|---|---|
| 3,211,285 | 10/1965 | Van Der Aungra | 206/455 |
| 3,511,990 | 5/1970 | Hauss | 206/455 |
| 3,792,771 | 2/1974 | Bonjzan | 206/455 |
| 3,844,649 | 10/1974 | Walter et al. | 206/455 |
| 4,305,498 | 12/1981 | Paytas | 206/455 |
| 4,426,000 | 1/1984 | Dunn | 206/455 |
| 4,470,510 | 9/1984 | Andreasson | 206/455 |

*Primary Examiner*—Joseph Man-Fu Moy
*Attorney, Agent, or Firm*—Fleit, Jacobson, Cohn & Price

[57] ABSTRACT

A film holder which is disclosed herein includes a inner frame defining a photo-sensitive plate insert slot between a partition plate, and outer frames each defining a dark slide insert groove between said inner frame. In this film holder, a plurality of stopper springs are formed on the peripheral sides of a body which is comprised of the partition plate and the inner frame. A plurality of hooks are formed on each the outer frames which are overlaid on the body to define the dark slide insert slot. These stopper springs and hooks are in the corresponding relationship, respectively, so that they are engaged with each other to lock the body and outer frames together in an overlaid relationship.

1 Claim, 5 Drawing Figures

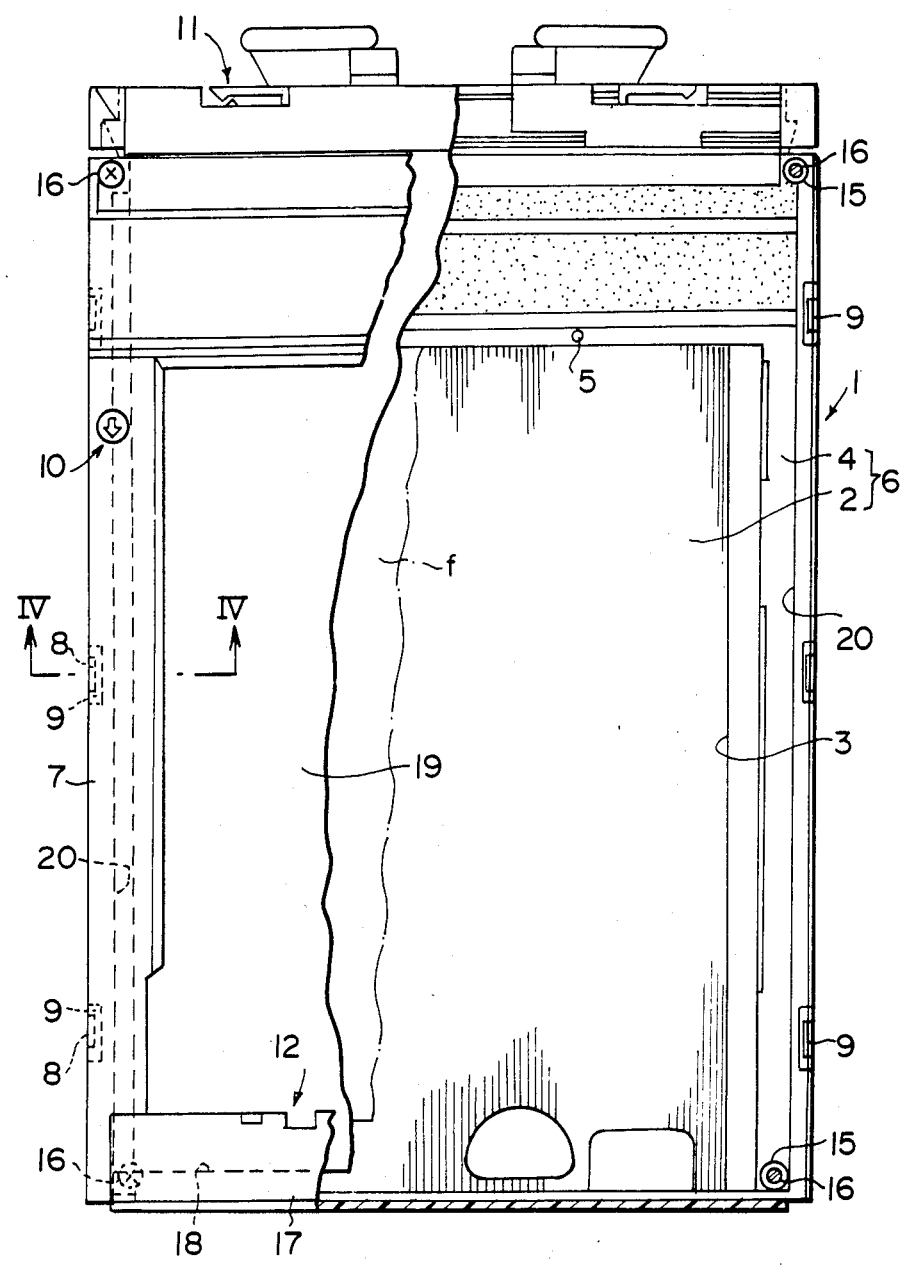

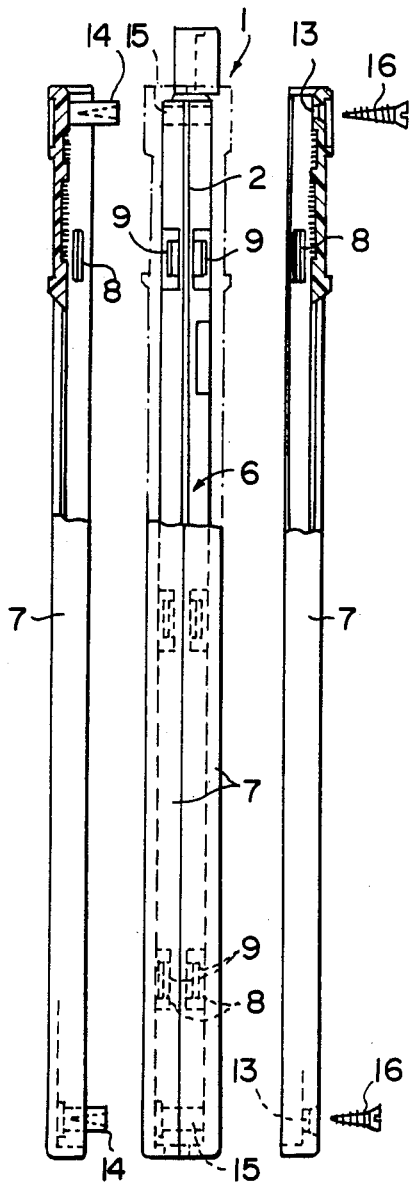
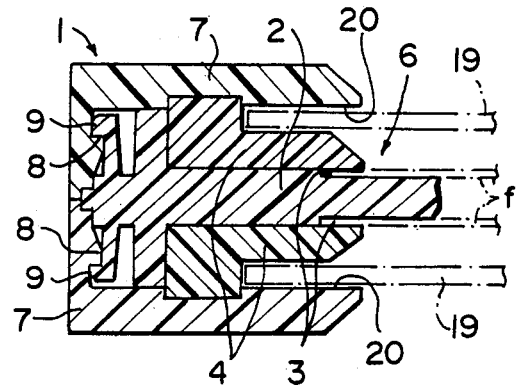
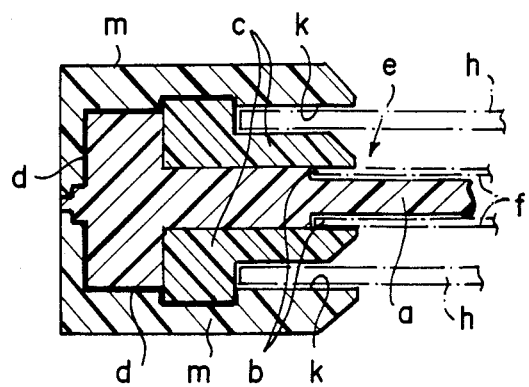

FILM HOLDER FOR CAMERAS

BACKGROUND OF THE INVENTION

1. Field of the Invention

The present invention relates to a film holder and more particularly, to a film holder in which a photo-sensitive plate, i.e., a photographic plate or a cut film is loaded and which is used to expose the photo-sensitive plate therein by mounting in on a camera and pulling a drak slide out of the film holder.

2. Description of the Prior Art

In the prior art, such a film holder has been plastically made of a synthetic resin and includes a body e which is comprised of a partition plate having grooves b into which a photo-sensitive plate (which will be referred to as a film hereinbelow) is inserted, and inner frames c, shown in FIG. 5. The inner frame c with the square bottom side eliminated has been overlaid on the partition plate a, and the upper side thereof has been partially spot welded to bond the inner frame c integrally to the partition plate a, thus forming the body e. A film f is inserted into the film groove b from the bottom side. A square cover frame m with one bottom side eliminated has been overlaid on the body a in a light shielding manner with a dark slide slot k through which a dark slide h for shielding the body e from a light, and a high frequency welding d has been effected over the entire surface, thus forming the film holder.

In the above prior art, with the welding between the partition plate a and the inner frame c, the welded portion may not appear on the outer surface of the film holder and therefore, they can be simply and easily bonded together such as by a direct spot welding. However, with the welding of the cover frame m, the welded portion may appear on the outer surface, resulting in a reduced or lost commercial value. Therefore, the film holder has been made using an expensive large-sized welding tool designed to cover the whole of the film holder and provide a uniform welding. As a result, although the film holder itself can be commercially produced leading to a low price, the producing cost is increased resulting in an expensiveness. The inner frame c and the cover frame m have been formed with their one bottom sides eliminated so that the film f may be inserted therethrough. In addition, the dark slide h may be inserted through the upper side into the film holder and fitted at its lower end into the slot in a holding plate. However, because the development and the loading of a film are conducted in a darkroom, certain portions of the film holder may hit against equipments or may be subjected to an impact in some cases. In such a case, the edges, particularly, the thin inner edges, of the cover frame or the like may be broken off or damaged. The double film holders having one side thus braken off or damaged must be wasted even if the other side thereof is satisfactirily fit for use, which is uneconomical.

SUMMARY OF THE INVENTION

The present invention has been accomplished to eliminate the above disadvantages. It is therefore an object of the present invention to provide a film holder which includes a inner frame defining a photo-sensitive plate insert groove between a partition plate, and outer frames each defining a dark slide insert slot between said inner frame, and which is easy to manufacture without welding over the entire surface.

According to the present invention, this object is achieved by providing a film holder wherein a plurality of stopper springs are formed on the peripheral side of a body comprised of said partition plate and said inner frame, and a plurality of hooks are formed on the peripheral side of each outer frame overlayed on the body to define the dark slide insert groove, these stopper springs and hooks being in the corresponding realtionship, respectively, so that they are engaged respectively with each other to lock the body and outer frames together in an overlaid relationship.

With such arrangement, any expensive welding tool and also any power are not required for bonding the outer frames to the body together, and the binding between the body and the outer frames is still simple and easy to effect. In addition, when the outer frame is damaged, such outer frame can be disengaged from the body by forcing it open such as with a driver, thus enabling the damaged outer frame to be replaced by one.

BRIEF DESCRIPTION OF THE DRAWINGS

The above and other objects, features and advantages of the invention will become apparent from the following description taken in conjunction with the accompanying drawings in which:

FIG. 1 is a partially cut-away front view of a film holder according to one embodiment of the present invention;

FIG. 2 is a partially cut-away side view illstrating a body and outer frames in disassembly;

FIG. 4 is a sectional view taken along the line IV—IV in FIG. 1; and

FIG. 5 is a sectional view illustrating the same portions of the prior art film holder as those in FIG. 4.

DESCRIPTION OF THE PREFERRED EMBODIMENT

Figure 3:
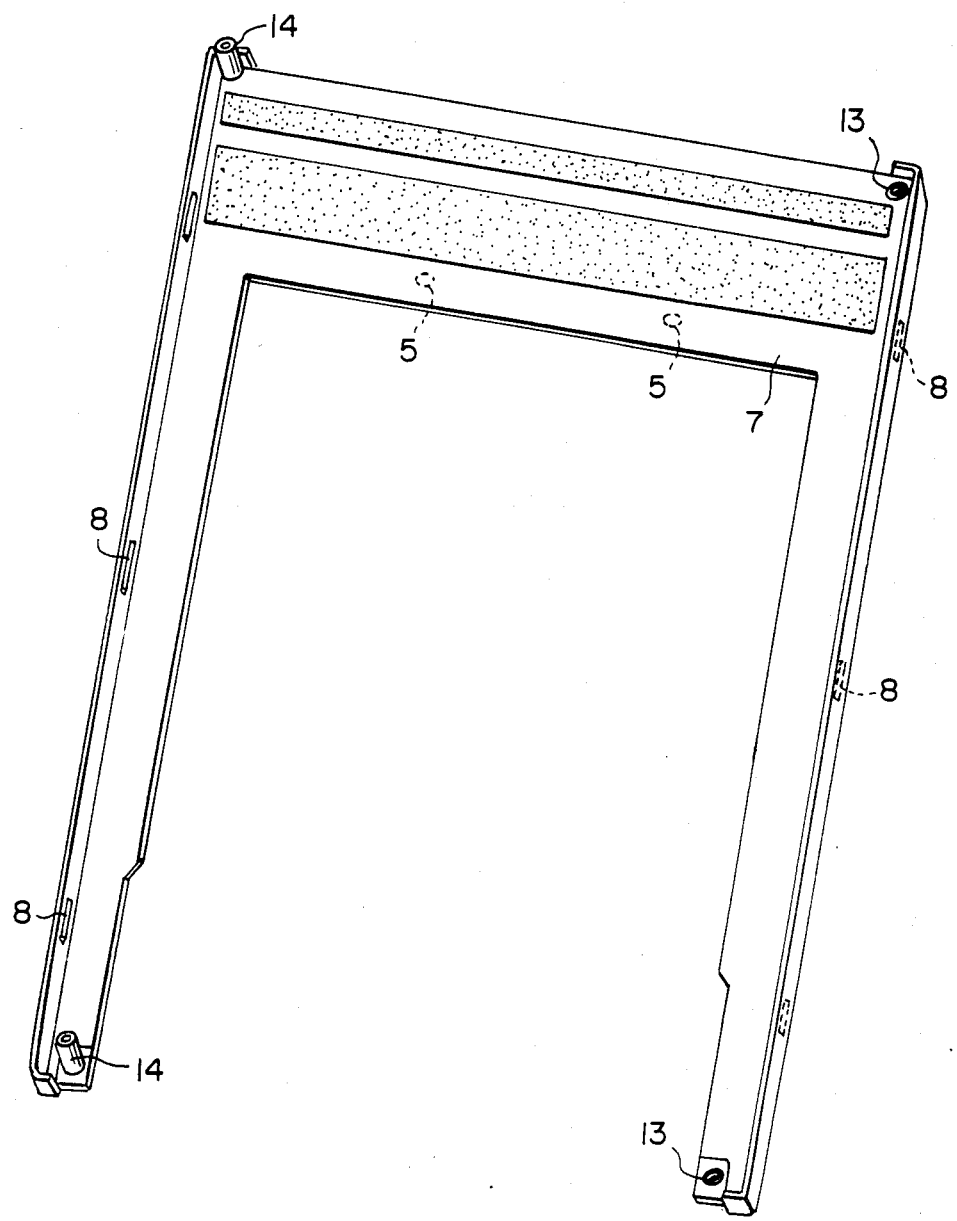
FIG. 3 is a perspective view of the inner surface of the outer frame.

Referring to FIG. 1, there is shown a double film holder 1 according to one embodiment of the present invention,, in which a cut film is used as a photo-sensitive plate. The film holder 1 has a film insert groove 3 for guiding a film f as a photo-sensitive plate onto the opoosite surfaces of a partition plate 2, which groove is defined by a bottom-opened inner frame 4. The inner frame 4 is welded at its upper side to the film holder 1 such as by a spot welding and made integrally with the partition plate 2 to constitute a body 6. It is to be understood that at the molding of the partition plate 2, the inner frame 4 may be molded simultaneously with the partition plate 2.

A bottom-opened outer frame 7 is overlaid on the body 6 with a dark slide insert slot 20 defined between both of them through which a dark slide 19 is inserted. The outer frame is formed with hooks 8 at suitable intervals on its peripheral side as shown in FIG. 3, and the body 6 is also provided with stopper springs 9 respectively at places corresponding to the hooks 8. It is to be noted that the reference numeral 10 desgnates a film indicator which is adapted to come into contact with a film as the latter is inserted, thereby causing a lever to be rotated in the outer frame, thus changing the direction of the arrow shown. Such a film indicator is disclosed in Japanese Utility Model No. 48533/84 which has previously been applied by the present applicant. A dark slide locker 11 is disclosed in Japanese Utility Model No. 157227/84 and a mark taking system 12 is also in Japanese Utility Model No. 157228/84.

Referring to Figures illustrating the embodiment, a threaded hole 13 is made at and a pin 14 having a small bore is formed at each the four corners of the outer frame 7 on one side or in the diagonal direction, and a through hole 15 through which the pin 14 is inserted is also made in the body 6 at each the similar places. The pin 14 is inserted through the through hole 15, and a screw 16 is threadedly inserted through the threaded hole 13 into the pin 14 to fasten the outer frames 7 and the body 6 together, thereby further ensuring the engagement of the hook 8 with the stopper spring 9. However, such fastening by screws is always not required.

In assembling operation, both the outer frames 7 are overlaid on the body 6 respectively on its opposite surfaces with each the hooks 8 of the frame 7 faced to each the stopper spring 9 of the body 6, and they are pressed to each other, whereby each the stopper springs 9 is engaged with each the hooks 8 through the resilence. Thereupon, the outer frames 7 are bound integrally to the body 6 on its opposite surfaces to constitute the film holder 1. The dark slide 19 is inserted into the film holder 1 along the dark slide insert slot 20 from the upper side, and the film holder 1 is closed at its bottom with a flappable holding bottom plate 17. The bottom side of the dark slide 19 is inserted into an insert slot 18 made in the holding bottom plate 17 to hold the film f in a light-shielded condition.

What is claimed is:

1. A plastic film holder for camera including a inner frame defining a photo-sensitive plate insert slot between a partition plate, and outer frames each defining a dark slide insert groove between said inner frame, wherein a plurality of stopper springs are formed on the peripheral sides of a body comprised of said partition plate and said inner frame, and a plurality of hooks are formed on each said outer frames overlaid on said body to define the dark slide insert slot, said stopper springs and hooks being in the corresponding realtionship, respectivly, so that they are engaged with each other to lock said body and outer frames together in an overlaid relationship.

* * * * *